US012391294B2

(12) United States Patent
Smith et al.

(10) Patent No.: US 12,391,294 B2
(45) Date of Patent: Aug. 19, 2025

(54) CARGO DEVICE (71) Applicant: Lear Corporation, Southfield, MI (US)

(72) Inventors: Lea Thomas Smith, Severna Park, MD (US); Jochen Kohlhofer, Altfraunhofen (DE); Dhananjay Ingale, Pune (IN); Brian Phillips, Almont, MI (US); Anthony Mollica, Royal Oak, MI (US); Michael Currie, Macomb, MI (US)

(73) Assignee: Lear Corporation, Southfield, MI (US)

( * ) Notice: Subject to any disclaimer, the term of this patent is extended or adjusted under 35 U.S.C. 154(b) by 469 days.

(21) Appl. No.: 17/872,419

(22) Filed: Jul. 25, 2022

(65) Prior Publication Data
US 2023/0053315 A1 Feb. 16, 2023

(30) Foreign Application Priority Data
Aug. 12, 2021 (DE) .......................... 102021121028.3

(51) Int. Cl.
*B62B 3/02* (2006.01)
*B60H 1/00* (2006.01)
*B62B 3/14* (2006.01)

(52) U.S. Cl.
CPC ....... *B62B 3/1404* (2013.01); *B60H 1/00014* (2013.01); *B62B 3/02* (2013.01)

(58) Field of Classification Search
CPC ...... B62B 3/1404; B62B 3/02; B60H 1/00014
USPC ...................................................... 280/79.2
See application file for complete search history.

(56) References Cited

U.S. PATENT DOCUMENTS

| 5,090,639 A | 2/1992 | Miller et al. |
| 5,445,080 A | 8/1995 | Austin |
| 7,527,316 B2 * | 5/2009 | Baeuerle ............... B60P 7/0815 410/104 |

(Continued)

FOREIGN PATENT DOCUMENTS

| DE | 297 15 759 U1 | 2/1998 |
| DE | 203 07 005 U1 | 9/2003 |

(Continued)

OTHER PUBLICATIONS

German Office Action for DE 10 2021 121 028.3 dated Mar. 3, 2022, 6 pages.

(Continued)

*Primary Examiner* — James A Shriver, II
*Assistant Examiner* — Hilary L Johns
(74) *Attorney, Agent, or Firm* — Brooks Kushman P.C.

(57) ABSTRACT

A cargo device, cargo management system and method of managing cargo are provided. A cargo device includes a platform having a top side configured to support cargo thereon; a cassette attached to the platform, the cassette configured to engage with at least one corresponding rail in a surface, and electrically communicate with the at least one corresponding rail to receive power and/or data related to the cargo from a controller to actuate the wheels, the cassette, or both; and wheels attached to the platform, the cassette, or both, the wheels being configured to move the platform along the surface. One or both of the cassette and the wheels are retractable based on the data such that the cassettes are moved between an engaged position with the corresponding rail and a disengaged position with the corresponding rail.

20 Claims, 5 Drawing Sheets

(56) References Cited

U.S. PATENT DOCUMENTS

| | | | |
|---|---|---|---|
| 7,785,056 B2* | 8/2010 | Sanford | B64D 9/00 414/535 |
| 8,251,634 B2 | 8/2012 | Kauhanen | |
| 9,630,777 B2 | 4/2017 | Yamashita | |
| 9,725,238 B2 | 8/2017 | Mathys et al. | |
| 10,077,158 B2 | 9/2018 | Lee et al. | |
| 10,814,982 B2* | 10/2020 | Brown | B64D 9/00 |
| 11,673,668 B2* | 6/2023 | Pfau | B65G 67/00 105/96 |
| 11,858,660 B2* | 1/2024 | Scheer | B64D 9/00 |
| 2009/0001750 A1* | 1/2009 | Horton | B60R 5/04 414/537 |
| 2009/0304482 A1* | 12/2009 | Sanford | B64D 9/00 414/812 |
| 2014/0308098 A1* | 10/2014 | Lert | B65G 1/1373 414/281 |
| 2019/0276238 A1 | 9/2019 | Dudek et al. | |
| 2020/0282880 A1 | 9/2020 | Jones et al. | |
| 2020/0346572 A1 | 11/2020 | Merta et al. | |
| 2021/0086667 A1 | 3/2021 | Ferré Fàbregas et al. | |

FOREIGN PATENT DOCUMENTS

| | | |
|---|---|---|
| DE | 20 2020 102 904 U1 | 9/2021 |
| EP | 3667583 A1 | 6/2020 |
| GB | 2 440 802 A | 2/2008 |
| JP | 2020090212 A | 6/2020 |
| JP | 2020203777 A | 12/2020 |
| WO | 2019/224281 A2 | 11/2019 |

OTHER PUBLICATIONS

First Office Action for Chinese Application No. 202210819033.3 dated Jan. 22, 2025, 9 pages.

* cited by examiner

CARGO DEVICE

CROSS-REFERENCE TO RELATED APPLICATIONS

This application claims foreign priority benefits under 35 U.S.C. § 119(a)-(d) to German utility model application number DE 10 2021 121 028.3, filed Aug. 12, 2021, which is incorporated by reference in its entirety.

TECHNICAL FIELD

The present disclosure relates to a device and methods for handling cargo, and more particularly, to a device and methods for facilitating loading or unloading of a vehicle.

BACKGROUND

Substantial labor, time and cost is spent on managing cargo and packages from all aspects of the supply chain, starting from the warehouse to getting packages the last mile (or last few miles) due to difficulties in efficiently and quickly transporting and storing the cargo, and the subsequent inefficient loading and unloading of a delivery vehicle. Certain types of cargo may further require particular environments that may not be readily available or customizable in a vehicle or warehouse.

Accordingly, devices and methods that assist cargo transport and improve cargo management are provided.

SUMMARY

According to one or more embodiments, a cargo device includes a platform having a top side configured to support cargo thereon; a cassette attached to the platform, the cassette configured to engage with at least one corresponding rail associated with a surface, and electrically communicate with the at least one corresponding rail to receive power and/or data related to the cargo from a controller to actuate the wheels, the cassette, or both; and wheels attached to the platform, the cassette, or both, the wheels being configured to move the platform along the surface. One or both of the cassette and the wheels are retractable based on the data such that the cassettes have an engaged position with the corresponding rail and a disengaged position with the corresponding rail.

According to one or more embodiments, a cargo management system includes a cargo device including a platform having wheels configured to move the platform along a surface, and a cassette or rail on the platform configured to engage with a corresponding rail or cassette in the surface, respectively, the cassette and rail being in electrical communication while engaged to transfer data therebetween; and a controller configured to actuate the wheels and/or engage the cassette with the rail. The cargo device is movable from a first location to a second location based on the data.

According to one or more embodiments, a method of managing cargo includes providing a cargo device including a platform having wheels, one or more cassettes configured to engage with one or more rails in a surface, the cargo device being configured to receive instructions from a controller; loading cargo onto the cargo device; and receiving data at the controller about the cargo at the cargo device to generate instructions. The method also includes actuating the wheels via the instructions to transport the cargo from a first location to a second location, and engaging the one or more cassettes with the one or more rails to electrically communicate or transfer power, logistical data, climate control instructions, or combinations thereof to the cargo device to move the cargo device from the first location to the second location.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments of the present disclosure. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Moreover, except where otherwise expressly indicated, all numerical quantities and ranges in this disclosure are to be understood as modified by the word "about". Practice within the numerical limits stated is generally preferred. Also, unless expressly stated to the contrary, the description of a group or class of materials by suitable or preferred for a given purpose in connection with the disclosure implies that mixtures of any two or more members of the group or class may be equally suitable or preferred.

This disclosure is not limited to the specific embodiments and methods described below, as specific components and/or conditions may vary. Furthermore, the terminology used herein is used only for the purpose of describing particular embodiments of the present disclosure and is not intended to be limiting in any way.

As used in the specification and the appended claims, the singular form "a," "an," and "the" comprise plural referents unless the context clearly indicates otherwise. For example, reference to a component in the singular is intended to comprise a plurality of components.

The term "substantially," "generally," or "about" may be used herein to describe disclosed or claimed embodiments. The term "substantially" may modify a value or relative characteristic disclosed or claimed in the present disclosure. In such instances, "substantially" may signify that the value or relative characteristic it modifies is within ±0%, 0.1%, 0.5%, 1%, 2%, 3%, 4%, 5% or 10% of the value or relative characteristic.

It should also be appreciated that integer ranges explicitly include all intervening integers. For example, the integer range 1-10 explicitly includes 1, 2, 3, 4, 5, 6, 7, 8, 9, and 10. Similarly, the range 1 to 100 includes 1, 2, 3, 4 . . . 97, 98, 99, 100. Similarly, when any range is called for, intervening numbers that are increments of the difference between the upper limit and the lower limit divided by 10 can be taken as alternative upper or lower limits. For example, if the range is 1.1. to 2.1 the following numbers 1.2, 1.3, 1.4, 1.5, 1.6, 1.7, 1.8, 1.9, and 2.0 can be selected as lower or upper limits.

According to one or more embodiments, a cargo device having at least one cassette for engagement with a surface is provided. The cargo device may be used for transporting, managing, loading or unloading cargo such as packages, goods or any suitable items, and also be used for storing cargo on board a vehicle. The cassette of the cargo device is configured to engage with the surface, and may further serve as an electrical contact for data communication or power transfer to the cargo device or to cargo on board the cargo device. Thus, the cargo device can cooperate with positioning devices on surfaces of warehouses, vehicles, and other locations (e.g., loading ramps) of a cargo management system, and also, in certain embodiments, communicate with the cargo management system to relay information about the cargo and control the climate environment for the cargo within the cargo device and/or within the vehicle or warehouse as based on the relayed information.

Figure 1A:
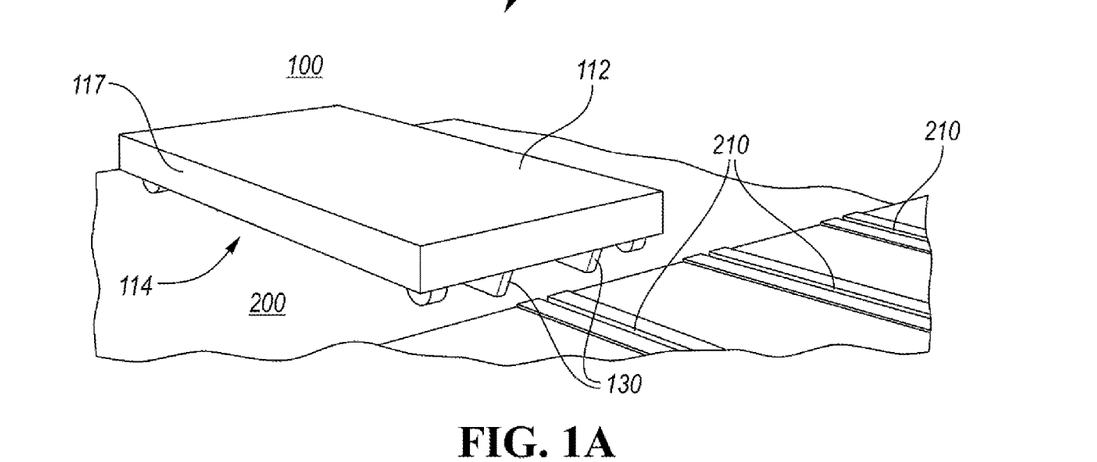
FIGS. 1A-1D are perspective views of a cargo device, according to various embodiments.
Figure 1B:
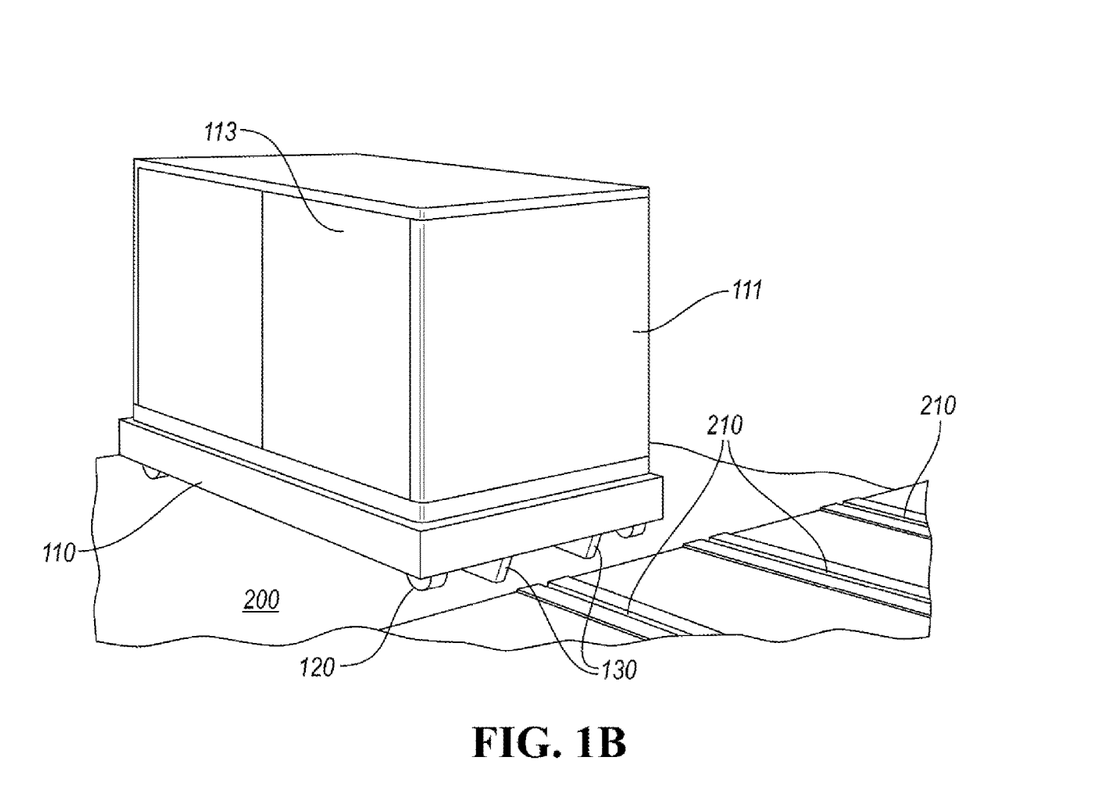
Figure 1C:
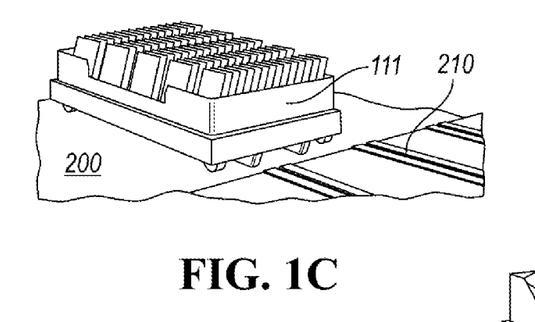
Figure 1D:
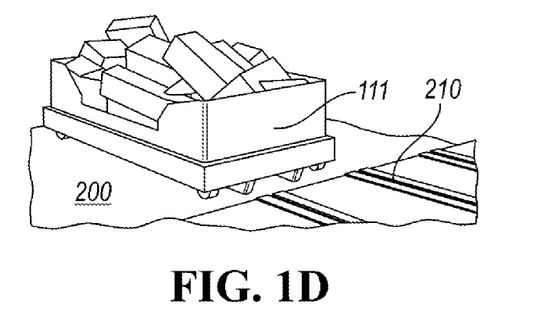
Figure 2:
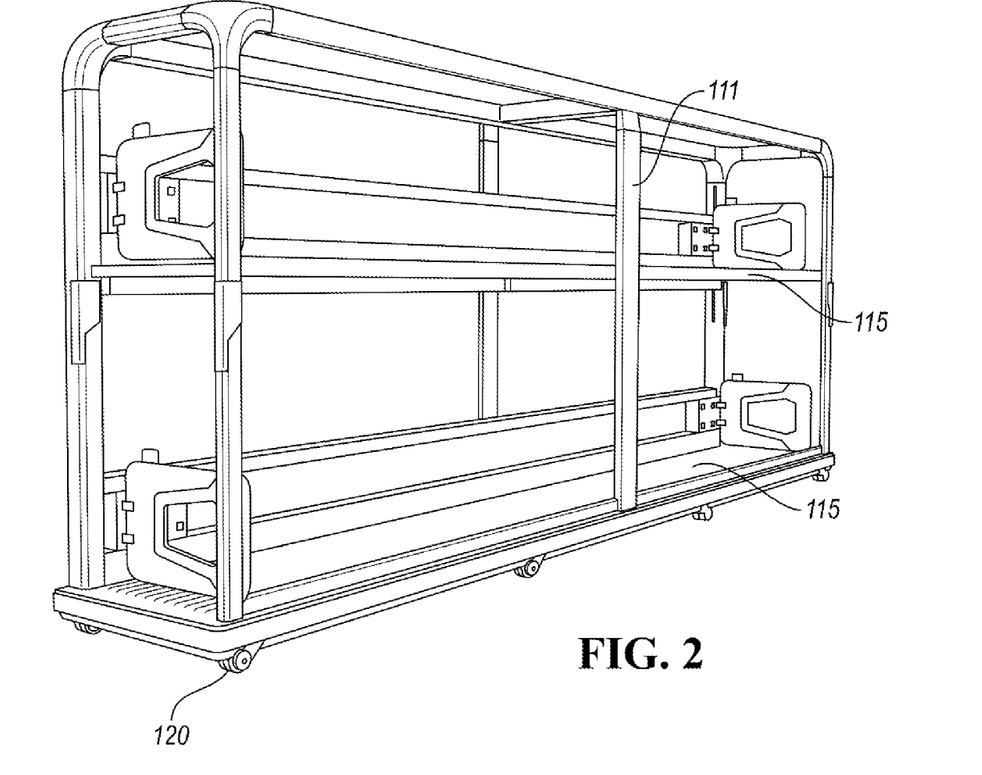
FIG. 2 is a perspective view of a cargo device, according to another embodiment.

FIG. 1A shows a cargo device 100, according to an embodiment. The cargo device 100 includes a platform 110 having a top side 112 for supporting cargo thereon, and a bottom side 114 opposite the top side 112. The top side 112 may support or receive a structure 111 thereon (as shown in FIGS. 1B-D and FIG. 2) for supporting the cargo, or as shown in the example of FIG. 1A, the top side 112 may form a surface which can directly receive cargo thereon. The structure 111 on the cargo device 100 may be any suitable structure, including, but not limited to, an open structure 111 (for example, as shown in FIGS. 1C-D, and FIG. 2), or an enclosed structure 111 with doors 113 (for example, as shown in FIG. 1B). The structure 111 may include one or more shelves 115, as depicted in FIG. 2, for supporting cargo thereon. In certain embodiments, the cargo device 100 may be equipped with a heating mechanism and/or a cooling system (not shown) which cooperates with the structure 111 to form a temperature controlled enclosure for the cargo within the structure 111, cooperable with a climate control system. For example, temperature sensitive cargo (e.g., food) can thus be stored within the cargo device 100 during transport and be maintained within an environment via a climate control system (for example, a heating mechanism and/or a cooling system) to optimize temperature of the cargo during transport and storage on the cargo device 100. The heating mechanism and/or cooling system may be powered by a battery (not shown) within the cargo device 100, or via an electrical connection made with the vehicle or warehouse such that the cargo device 100 is supplied with power (for example, via a cassette 130 which will be discussed in further detail below).

The bottom side 114 of the platform 110 includes one or more wheels 120 attached thereto for moving the cargo device 100 across a surface 200 by rotation of the wheels 120 to move the platform 110. The surface 200 may be any suitable surface where cargo may be or needs to be transported, including, but not limited to, a warehouse floor, surfaces of a vehicle compartment, a loading ramp, and the like, such that one or more rails 210 are included on, embedded within, or otherwise associated with the surface 200 for engagement of the cargo device 100. In certain embodiments, the wheels 120 may be in mechanical communication with one or more motors for rotating the wheels 120 to propel the cargo device 100 across the surface 200, or, in other embodiments, the wheels 120 may be manually rotated via pushing of the platform 110 across the surface 200. In one or more embodiments, the wheels 120 may be selectively rotated by either a motor or manually, as based on an operator selection. The wheels 120 may be configured to transport the cargo device 100 in a single direction, two directions, multiple directions or in any direction.

The cargo device 100 also includes one or more cassettes 130 on the bottom side 114, with each cassette 130 being engageable with the one or more rails 210 located on or embedded within the surface 200. The cassettes 130 and rails 210 are not particularly limited to any shape and size as long as they are suitable for mechanical engagement and/or electrical communication with each other, as will be described in detail below. Although shown as a single cassette engaging a single rail, a cassette may engage with one or more rails, for example, one cassette may engage with two separate rails simultaneously, and the depiction of a single cassette with a single rail is not intended to be limiting. The cassettes 130 may include a body that mechanically or magnetically couples with the rails 210 via a magnetic or electromagnetic coupling, or via interference, transition, or clearance fit of the cassette 130 with the rails 210. The cassettes 130 may be attached to the platform 110 in any suitable manner, such as but not limited to, being secured to the bottom side 114 such that the cassette 130 is at least partially positioned below or housed within the platform when retracted (see FIG. 3A). As such, one or more surfaces of the cassettes 130 may directly contact the rails 210 in an engaged position (see, for example, FIG. 3B), such that the cargo device 100 may be secured to the surface 200 (in a storage mode) and also serve as an electrical contact to transfer power and/or data to and from the cargo device 100. Although shown on the bottom side 114 of the platform 110, the cassettes 130 may be on any suitable surface of the cargo device (e.g., on one or more of the side surface(s) 117 of the platform 110) such that the cassettes are selectively engageable with the surface 200 of travel via the rails or guided by the rails, and the depiction of the cassettes on the bottom surface is not intended to be limiting. Although the cassette 130 may be able to communicate via the rails 210, the cargo device 100 may be equipped to be wirelessly controllable over a network such that the cassette 130 can be controlled remotely for engaging or disengaging with the rails 210. As such, in examples where the wheels 120 and the cassette 130 are integrated, the cargo device 100 may be wirelessly controlled to selectively engage the cassette 130 to secure the cargo device 100, and disengage the cassette 130 to allow transport of the cargo device 100, and certain logistical data (e.g., location data, or delivery data) or temperature data may be supplied via the cassette 130 engagement with the rails 210.

Furthermore, in certain embodiments, where the wheels 120 may be integrated with cassettes 130, the wheels 120 are connected to the bottom side 114 via the cassette 130, and can be controlled by the cassette 130 to direct the travel of the cargo device 100 across the surface 200, as well as facilitate alignment and positioning of the cassette 130 with the rails 210 for engagement with the rails 210.

Figure 3A:
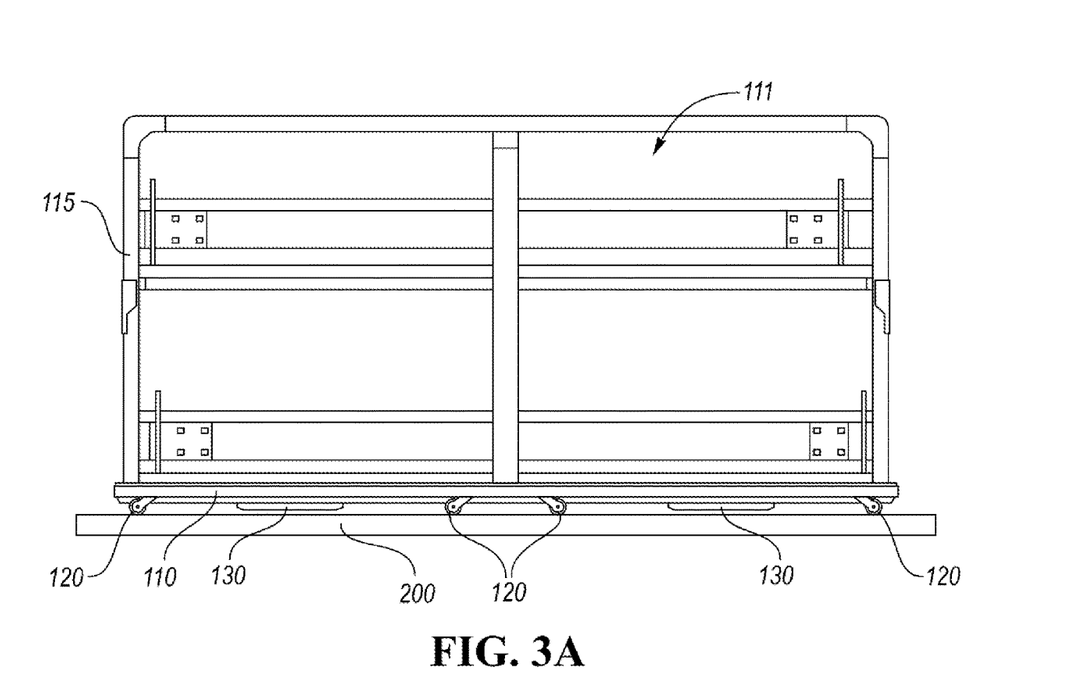
FIG. 3A is a front view of the cargo device of FIG. 2 with the cassette disengaged.
Figure 3B:
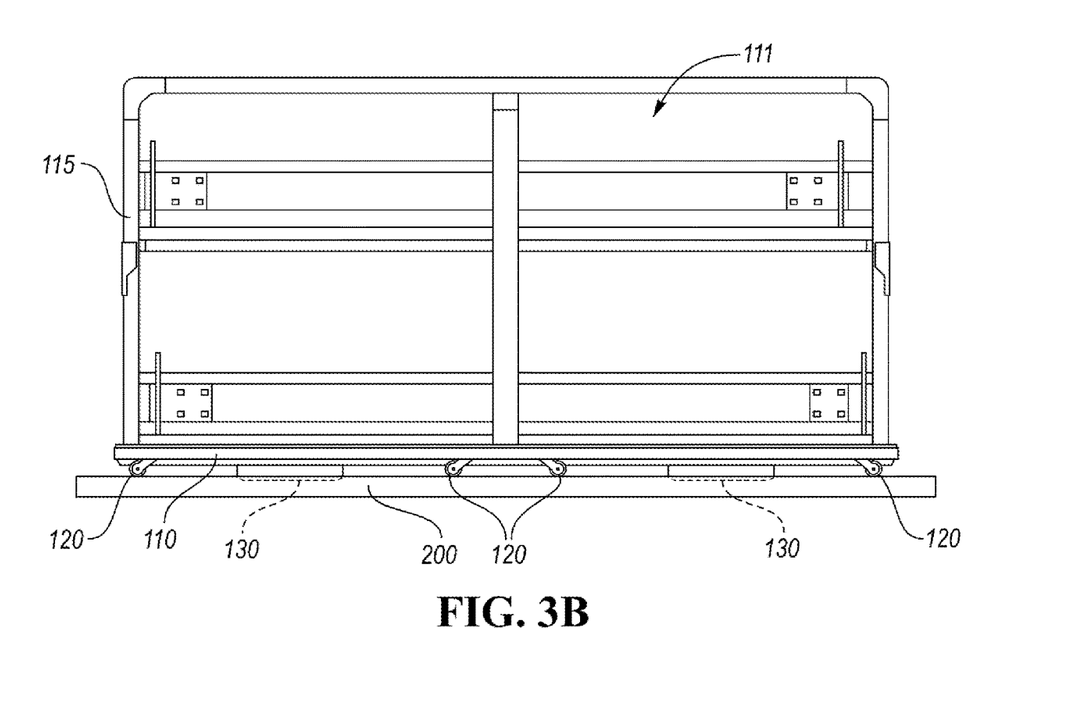
FIG. 3B is a front view of the cargo device of FIG. 2 with the cassette engaged.

When engaged with the rails 210, as shown in FIG. 3B, the cassettes 130 and rails 210 may be mechanically or magnetically coupled to secure the cargo device 100 with respect to the surface 200 (i.e., in a storage position), and may further provide an electrical connection for conveying electrical power or, in some embodiments, digital information or interchangeably, data related to and from the cargo loaded on the cargo device 100. Thus, the cassettes 130 can facilitate electrical communication between the cargo device 100 and a cargo management system such that the cassettes and rails may transfer and/or receive digital data or information such as instructions from a controller, or logistical, locational, temperature environment data, or other information as related to the cargo to the cargo device 100. The electrical communication may also, or alternatively, be used to power the cargo device 100 such that when the cargo device 100 is in the transport mode, the platform 110 can be propelled via the wheels 120, and in some embodiments, movement of the cargo device 100 may be based on the digital information such that the cargo is transported a first location to a second location. Engagement of the cassettes 130 with the rails 210 may also be used to charge a battery (not shown) of the cargo device 100 such that the battery supplies power to the various features of the cargo device 100. As such, the cargo device 100 can provide power to features such as a battery, the motors for the wheels, and/or the heating mechanism or cooling system of the cargo device 100, as well as the cassettes 130 for retraction. In certain embodiments, the data communicated to and from the cargo device 100 via the cassette 130 may further control the heating mechanism and/or cooling system based on the specific heating and/or cooling requirements of the cargo loaded thereon (e.g., via temperature environment data for the cargo to control a climate control system), and also may control the wheels to position the cargo within a vehicle compartment or warehouse as based on the data related to the cargo (e.g., delivery address or order). With respect to the data communication, the cargo device 100 may also include or be in communication with a controller 720 (shown in FIG. 6) of a cargo management system 700, which may provide specific instruction for operating the motors, cassettes and/or receiving/transferring the digital information.

In embodiments where the wheels 120 and the cassettes 130 are not integrated with each other, one or both of the cassettes 130 and the wheels 120 may be independently connected to and retractable with respect to the platform 110 to facilitate movement of the cargo device 100 when in a transport mode, and securement of the cargo device 100 when in a storage mode. For example, as shown in FIG. 3A, the cassettes 130 may have a retracted cassette position within a respective recess (not shown) in the bottom side 114 of the platform 110 when disengaged in the transport mode, and an extended cassette position, shown in FIG. 3B, extending from the bottom side 114 such that the cassette 130 can engage with the rails 210, and the cargo device 100 can be held in the storage mode (by locking via the cassettes with the rails and/or via control the wheels). Furthermore, in one or more embodiments, the wheels 120 may be retractable into a wheel retracted position where the wheels are stored in respective recesses (not shown) in the platform 110, for example when the cargo device 100 is in the storage mode, such that the bottom side 114 of the cargo device 100 contacts the surface 200, resulting in the cargo device 100 being stationary as the only contact is via the cassettes 130. The wheels 120 may have an extended wheel position in the transport mode, such that the platform 110 is supported on the wheels 120 which contact the surface 200, and the bottom side 114 is not in contact with the surface 220. In the extended wheel position in the transport mode, the cargo device 100 is thus movable with respect to the surface 200 via the wheels 120. In an example where both the wheels 120 and the cassette 130 are retractable, when the cargo device is stored in the storage mode, the extended cassette position may position the cassette 130 within the rails 210 past the wheels 120, and the wheels 120 may also be retracted to the retracted wheel position. In an example where only the wheels 120 are retractable, in the extended wheel position for transporting the cargo device 100 in the transport mode, the wheels 120 may extend past an end of the cassette 130 such that the cassette 130 is not in contact with the rails 210 or the surface 200 to allow travel of the cargo device 100. When the cargo device 100 is to be stored in storage mode, the wheels 120 may be retracted to the retracted wheel position such that the end of the cassette 130 extends past the wheels 120 to engage the rails 210 of the surface 200 such that the cargo device is stored. In another example, where only the cassette 130 is retractable, in the extended cassette position for the storage mode, the cassette 130 may have an end extending past the wheels 120 to engage the rails 210 in the surface 200 to secure the cargo device 100 in a storage position such that the cassette 130 locks the platform 110 in place, even while the wheels 120 may be in contact with the surface 200. As such, in an example where both the cassettes 130 and the wheels 120 are retractable, depending on whether the cargo device 100 is to be in storage mode or the transport mode, the respective feature may be in the extended position, and in embodiments where only one feature is retractable, the retractable features position changes based on the storage or transport mode of the cargo device.

In addition to the storage mode (where the cargo device 100 is secured with respect to the surface 200), and the transport mode (where the cargo device 100 is movable with respect to the surface 200), in at least one example, the cargo device 100 has an intermediate mode where the cassettes 130 may be engaged with the rails 210, but the cassette 130 may still allow movement along the surface 200 via the wheels 120. Thus, either the cassettes 130 or the wheels 120 may allow for the cargo device 100 to be secured in the storage mode, such that the wheels 120 can be unlocked while the cassette 130 is engaged in the intermediate mode. As such, the wheels 120 may function simultaneously during engagement where the electrical contact can provide specific instruction to the cargo device (e.g., movement instructions, and can also change the temperature environment based on data such as, for example, an external environment temperature or location) or may not function during engagement if in the storage mode.

In one or more embodiments, the cargo device 100 may further include one or more sensors to determine proximity and alignment of the corresponding cassettes 130 and rails 210 (i.e., a detection and/or alignment system may control the wheels 120). The one or more sensors may be used to determine when retraction of the wheels 120 and/or the cassette 130 is appropriate such that the cargo device 100 can be switched between the transport and storage modes, and further, can be controlled when in the transport mode or the intermediate mode. For example, once the cassettes 130 are aligned for engagement with the rails 210, the sensors may trigger retraction of the wheels 120 and/or extension of the cassette 130, as based on which features are movable with respect to the platform 110.

As such, the cassettes 130 are configured to engage and disengage with one or more of the rails 210 that may be placed on or embedded in the surface 200 where the cargo device 100 will travel, and supply power and/or communicate data to and from the cargo device 100 to control features on the cargo device 100 (e.g., the cassette, the wheels, motors, heating mechanism, cooling system, etc.) as based on information related to the cargo (e.g., delivery address, perishability, etc.). Retraction and extension of the cassettes 130 may be automatic via a controller or manual, via a mechanical lever (e.g., a foot pedal). In one or more examples, the cassettes 130 and/or rails 210 may be further described by the following application Ser. No. 17/116,959 filed on Mar. 6, 2019 and published as US 2021/0086667; Ser. No. 16/294,289 filed Mar. 6, 2019 and published as US 2020/00282880, which are hereby incorporated by reference.

In a variation, although not shown, the cassettes and rails may be reversed between the cargo device 100 and the surface 200 for conveying digital information and/or supplying power. For example, the cargo device could include rails 210 within the platform while various surfaces that will be traveled along could include cassettes 300 which extend for engagement with the rails of the cargo device.

Figure 4:
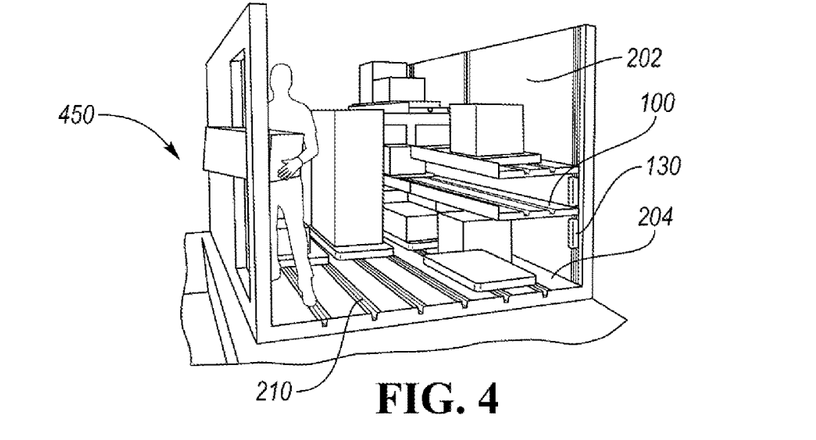
FIG. 4 is cross-section view of cargo devices in a vehicle compartment, according to one or more embodiments.

Referring to FIG. 4, the cargo device 100 may also include cassettes 130 on other surfaces of the platform 110, such as but not limited to, a side surface 117 of the platform 110 which may facilitate positioning of the cargo device 100 in any direction along any surface 200. For example, the cassettes 130 and rails 210 in FIG. 4 allow the cargo device 100 to be positioned vertically along a wall 202. In another embodiment, the cassettes 130 may remain attached to the bottom surface 114 but can be extended in a different direction (for example, corresponding to the wall surface 202) to the rails 210 they are to be engaged with. For example, although not shown in the Figures, the cassettes 130 may be secured to the platform 110 at the bottom side 114, may extend past the side surface 117 of the platform 110 instead of downward past the bottom side 114 to engage rails 210 on the wall 202. It may be appropriate to maintain the cargo device 100 in an upright orientation while traversing along a non-horizontal surface such as vertically along the wall 202, such as in embodiments where the platform 110 does not include the structure 111 thereon. As used herein an upright orientation is not intended to be particularly limiting and merely indicates that the position or orientation of the cargo does not change or substantially change (i.e., more than 90 degrees in any direction, more preferably 45 degrees, or even more preferably 20 degrees) when the cargo device 100 moves along a surface 200 such as a vertical surface 202. The cassettes 130 and rails 210 may be positioned or configured to facilitate such movement while upright. Rails 210 may be positioned at specific locations to facilitate the transfer of information or power, such as to indicate a cargo device's position or facilitate movement in a specific area. For example, as depicted in FIG. 4, a vehicle compartment 450 for storing cargo to be transported in a vehicle (see FIG. 5) may have a system of several rails 210 for arranging a plurality of cargo devices 100 in the compartment 450 via corresponding cassettes 130 and rails 210.

Figure 5:
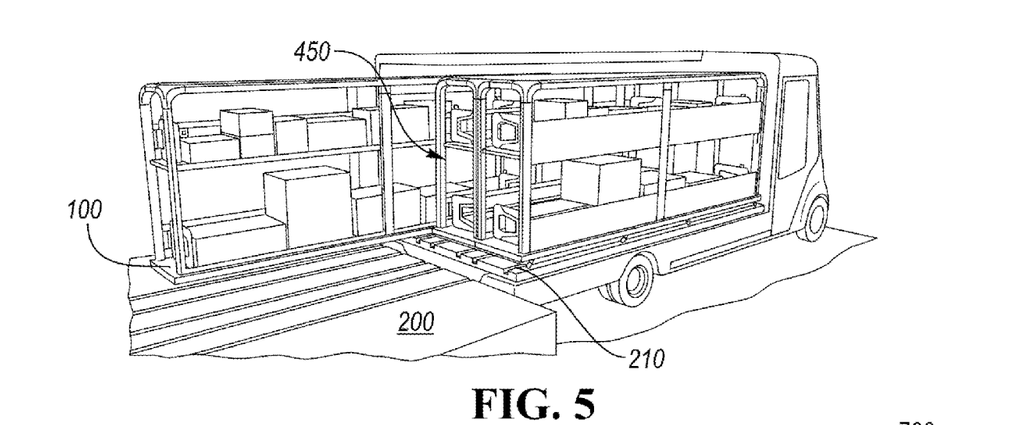
FIG. 5 is perspective view of a cargo device being loaded into a vehicle compartment, according to an embodiment.

Referring FIGS. 4-5, the cargo device 100 may be sized such that a plurality of cargo devices 100 can fit in a vehicle compartment 450. Although, the rails are not particularly limited to a surface of a vehicle compartment 450 the rails will be described here in reference to a vehicle compartment 450. The rails 210 may be positioned on the floor surface 204 and/or walls 202 of the vehicle compartment 450 for facilitating and/or securing a cargo device in a small volume efficiently. For example, as depicted in FIG. 4, the rails 210 are located on the floor surface 204 and walls 202 of the vehicle compartment 450 for allowing movement of the cargo device 100 over the surfaces 200 and for securing the cargo device 100 in predetermined locations in the vehicle compartment 450 as based on communication with the cassettes 130 of the cargo device 100. The predetermined locations may be based on instructions received at the cassette 130 from a controller, the instructions being based on information or data about the cargo such as the delivery location. For example, cargo devices may be loaded in a vehicle compartment 450 such that packages that will be delivered first are located closer to the driver. As shown in FIG. 5, the rails 210 are located on the floor 204 and facilitate the placement of multiple cargo devices 100 in the vehicle compartment 450.

Figure 6:
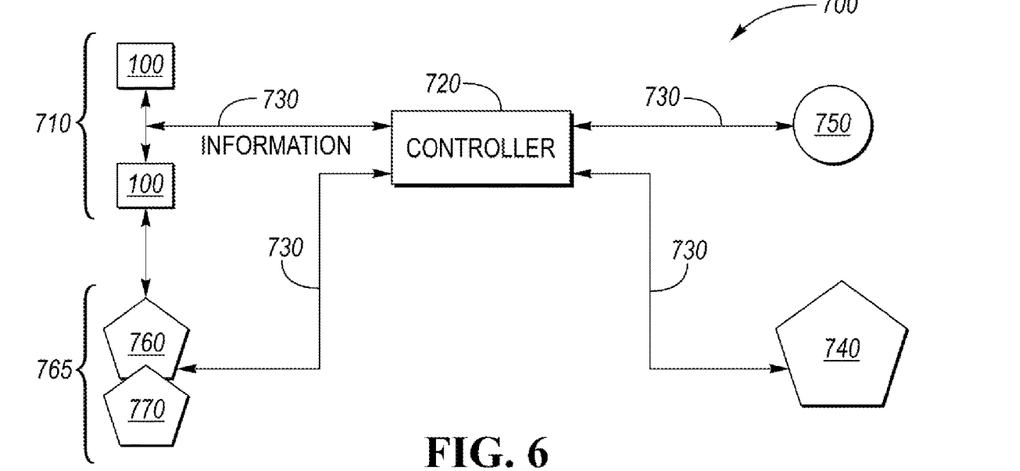
FIG. 6 is a schematic illustration of a cargo management system, according to an embodiment.

Referring to FIG. 6, a cargo management system 700 is shown according to an embodiment. In at least one embodiment, a controller 720 may be incorporated in a cargo device 100 or may be external to the cargo device 100 and in wireless communication with the cargo device 100 via electronics located on the cargo device 100 (e.g., within or on the platform) for integrating the cargo device with the cargo management system 700. The controller 720 may be in communication with the cargo device 100 by any suitable manner, such as but not limited to, WIFI, Bluetooth, a wire or other electrical communication and/or via the engagement between cassettes 130 and rails 210. The controller 720 may provide instructions or machine instructions for operating the cargo device 100 as based on the cargo management system 700. For example, the controller 720 may provide instructions for actuating the motors and/or wheels 120 thus propelling the cargo device 100 from a specific location to another location based on data associated with the cargo (e.g., delivery address). In further embodiments, the controller 720 may activate a heating mechanism or a cooling system for controlling the environment within the structure 111 as based on the cargo on the cargo device 100. The controller 720 may also facilitate transfer of or receive logistical, locational, identifying or any other information about the cargo or cargo device 100 to or from the cargo device 100. For example, the controller 720 may control the environment of the cargo device 100 as based on an external environment or location (e.g., outdoor vs indoor) in order to maintain an appropriate environment for the cargo. The controller 720 may be configured to receive information (e.g., logistical data or perishability data) from other sources such as a sorting machine, databases, the cargo itself, or other sources such as customer purchasing systems. As previously discussed with respect to the retractability of the cassettes and wheels, the controller 720 may instruct the cassettes 130 to extend into the extended position for engagement with the rails 210 or to retract for disengagement. Furthermore, the controller 720 may instruct the wheels to retract and/or extend.

In an example, the cargo device 100 may be configured to specifically coordinate or operate with a sorting machine. A sorting machine may be used to organize or sort cargo by various parameters such as order due date, geographical location, type of goods, etc. For example, a cargo device 100 may be of an appropriate height to receive goods or cargo from a sorting machine. Similarly, a cargo device 100 may be configured for cooperative engagement with a sorting machine. Thus, the controller may instruct the cargo device as based on data indicative of logistical details, location, due dates, etc. as based on the determinations of the sorting machine.

In another example, the cargo device 100 may be configured to specifically coordinate or operate with a vehicle such that the vehicle can be efficiently loaded via coordinated control of a loading platform with the cargo device 100 thereon, and horizontal movement of the cargo device 100 (with respect to a forward/aft movement direction of the vehicle). Upon loading into the vehicle, the cargo device 100 may be movable in the forward/aft direction as based on the data and/or for alignment of the cassettes with the rails to connect the cargo device 100 for data or power transfer. As such, the cargo device 100 may be charged (i.e., a battery may be charged) via engagement of the cassette and rails while being transported in the vehicle, or the environment may be controllable based on the loading into the vehicle and the heating mechanism and/or cooling system thereon.

Referring again to FIG. 6, the cargo management system 700 includes at least one cargo device 100 and/or a plurality of cargo devices 710. The cargo devices 100 of the cargo management system will collectively be referred to hereinafter as cargo devices 710. The cargo devices 710 may include wheels and cassettes as discussed above, with reference to FIGS. 1A-D, FIG. 2, and FIGS. 3A-B. The cargo devices 710 and the controller 720 may be configured to communicate back and forth transferring and receiving data or information 730 between each other via the rails (not depicted) or via a wireless communication method. The data 730 may be used to operate each of the cargo devices 710 independently, collectively, or simultaneously. The data or information 730 may include logistical information used to coordinate transporting cargo or specific payloads from a first location or destination to a second location or destination via the cargo devices 710, and may further control a heating mechanism 760 or a cooling system 770 of a climate control system 765 which can heat and/or cool the structure on a cargo device based on the data or information 730 related to the cargo (e.g., perishability). For example, the controller 720 may receive information 730 such as from a sorting machine 740 that cargo is ready for delivery or transporting. The controller 720 may then instruct the cargo device 710 to the sorting machines location, the at least one cargo device 710 may then receive the cargo and transport it along a surface to a new second location as based on the data related to the cargo items thereon. In a refinement, the controller 720 may instruct a cargo device 710 to receive cargo from the same or different locations and transport the cargo to multiple or the same destination. The new location may be a vehicle or a compartment of a vehicle. The controller 720 may repeat these steps for various or different cargo devices 710 and cargo based on information 730 received from various sources including but not limited to each of the platforms, sorting machine, human input or a customer purchasing/ordering system. The cargo devices 710 may be provided with routes or paths (i.e., route instructions) that do not interfere with one another or may include sensors to avoid collisions and/or disturbances. The controller 720 may further control other parameters such as, for example, speed of the cargo devices 710. In another example, the controller 720 may receive data or information 730 that the cargo needs to be kept at a refrigerated temperature and may activate a cooling system to maintain the temperature in the cargo device during transport. The cargo devices 710 may also communicate data related to a battery charge and/or use engagement between cassettes and rails to charge a battery or for direct powering of systems on the cargo device (e.g., motors, heating mechanisms, or cooling systems). The controller 720 may further communicate with additional devices or remote devices 750 or facilitate communication of the cargo device(s) 710 with the additional devices or remote devices 750. For example, the controller 720 may communicate with a vehicle (e.g., a loading ramp) or mobile device as remote devices 750. In the example where the remote device 750 is a loading ramp, the controller 720 may instruct the loading ramp to a loading position to facilitate movement of the cargo device onto the ramp, and into the vehicle compartment.

Figure 7:
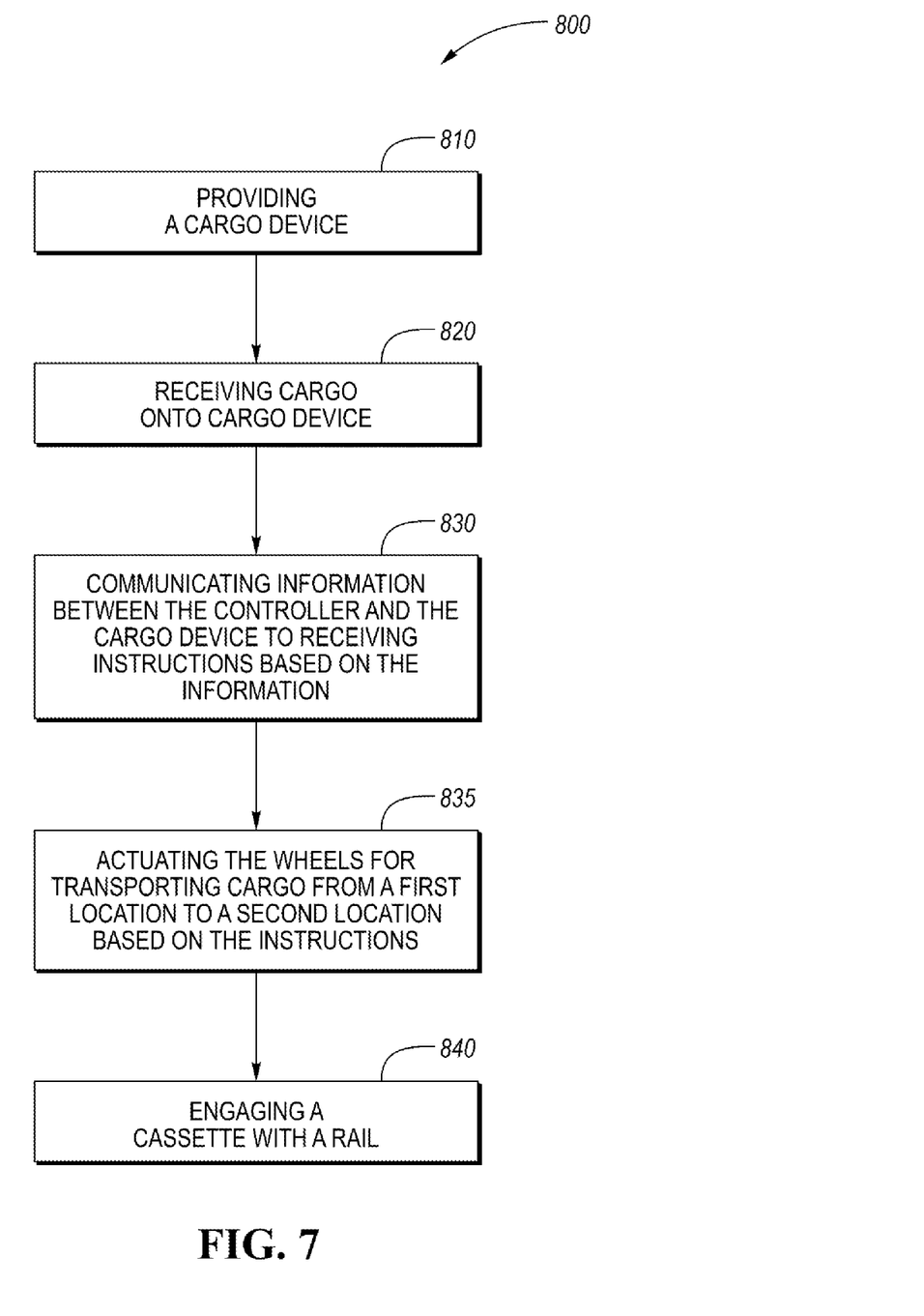
FIG. 7 is a flowchart of a cargo management method, according to an embodiment.

In another embodiment as shown in FIG. 7, a method of managing cargo is provided. The method 800 includes providing a cargo device as described above (i.e., step 810), and receiving cargo onto the cargo device (i.e., step 820). The cargo device may receive or convey information to the controller which may then transfer instruction to the cargo device (i.e., step 830) based on the cargo loaded thereon. The instructions may provide for actuating the wheels of the cargo device to transport the cargo from a first location to a second location (i.e., step 835), or in another embodiment, may activate a climate control system, and be based on the information received and conveyed. In certain embodiments, the instruction may control a loading ramp such that the cargo device can be loaded onto a loading ramp in a lowered position, move the loading ramp from a lowered position to a raised position, and move the cargo device from the loading ramp into the vehicle compartment for engagement of the cassette with the rails therein.

The cargo device may provide information related to the cargo, its location, temperature requirements, destination and/or arrival to the controller. For example, the controller may request location information from the cargo device and/or provide route instruction or destination information to the cargo device. In some embodiments, this is done before actuating the wheels. At any point the cargo device may further deploy a cassette from a retracted position to an extended position for engaging a rail (i.e., step 840). Engaging the one or more cassettes with one or more rails may occur during transport which may facilitate communication of information and/or electrical power. For example, the cargo device may at least engage the cassettes with the rails prior to or as it moves onto or into a vehicle or vehicle compartment. When the cassette and rail are engaged additional information may be supplied to the cargo device, such as location, the status of cargo (e.g., delivered) or a temperature requirement (e.g., the climate control system can be activated). The engagement may also simultaneously or separately charge a battery located on the cargo device. The engagement may also facilitate or secure the device in a physical location such as a predetermined position within a vehicle compartment 450 when storage mode is activated. The predetermined position may be in accordance with instructions from the controller and may be based on information and data received and/or transferred to the controller.

Thus, according to one or more embodiments, a cargo device is provided with wheels and at least one cassette for communicating with and/or engaging with rails within a travel surface or a storage surface. A cargo management system controls movement, power systems, and/or climate control systems of the cargo device, as well as correlated features (e.g., a loading ramp) as based on data related to the cargo on the cargo device. As such, the cargo device can be transported around a facility, positioned within a vehicle, and/or controlled for temperature as based on the specific requirements of the cargo to facilitate logistics and maintenance of cargo. The cassettes and/or the wheels are retractable to facilitate engagement of the cassette with the rails.

While exemplary embodiments are described above, it is not intended that these embodiments describe all possible forms encompassed by the claims. The words used in the specification are words of description rather than limitation, and it is understood that various changes can be made without departing from the scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on specific application and implementation. These attributes can include, but are not limited to cost, strength, durability, life cycle cost, marketability, appearance, packaging size, serviceability, weight, manufacturability, ease of assembly, etc. As such to the extent any such embodiments are described as less desirable than other embodiments or prior art implementations with respect to one or more characteristics, these embodiments are not outside the scope of the disclosure and can be desirable for particular applications.

What is claimed is:

1. A device for moving cargo, comprising:
a platform comprising a top side configured to support cargo thereon;
a cassette attached to the platform, the cassette is configured to engage with at least one corresponding rail associated with a surface, and electrically communicate with the at least one corresponding rail to receive at least one of power and data related to the cargo from a controller; and
a plurality of wheels attached to at least one of the platform and the cassette, the plurality of wheels configured to move the platform along the surface based on the data,
wherein at least one of the cassette and the plurality of wheels are retractable based on the data such that the cassette is in an engaged position with the at least one corresponding rail and a disengaged position with the at least one corresponding rail.

2. The device of claim 1, wherein the data related to the cargo is at least one of temperature data, location data, and delivery data, such that at least one of the plurality of wheels and the cassette are activated based on the data.

3. The device of claim 1, further comprising a controller configured to select a transport mode for the device where the plurality of wheels is configured to move the platform.

4. The device of claim 3, wherein in the transport mode, the cassette is disengaged with the at least one corresponding rail.

5. The device of claim 1, further comprising a controller configured to select an intermediate mode for the device where the cassette is engaged with the at least one corresponding rail such that the cassette communicates via the at least one corresponding rail while allowing movement of the platform with respect to the surface via rotation of the plurality of wheels.

6. The device of claim 1, further comprising a controller configured to select a storage mode for the device where at least one of the plurality of wheels and the cassette is secured to prevent movement of the platform with respect to the surface.

7. The device of claim 6, wherein in the storage mode, the cassette is engaged with the rails, and the plurality of wheels is retracted such that a bottom side of the platform contacts the surface.

8. The device of claim 1, wherein the platform includes a support structure on the top side for receiving cargo thereon.

9. The device of claim 8, wherein the support structure is an enclosed support structure and includes a climate control system for the cargo within the enclosed support structure, the climate control system receiving at least one of the electrical power and instructions related to the data from the controller via the cassette engagement with the at least one corresponding rail.

10. A cargo management system, comprising:
a cargo device including a platform comprising a plurality of wheels configured to move the platform along a surface, and a cassette or rail on the platform configured to engage with a corresponding rail or cassette in the surface, respectively, the cassette and rail in electrical communication while engaged to transfer data therebetween; and
a controller configured to at least one of actuate the wheels and engage the cassette with the rail, wherein the cargo device is movable from a first location to a second location based on the data.

11. The cargo management system of claim 10, wherein the cargo device includes a climate control system, and power is transferred to the cargo device via the rail to power the climate control system via the controller, and the data is transferred to the cargo device to control the climate control system via the controller.

12. The cargo management system of claim 10, wherein at least one of the cassette and the plurality of wheels is retractable within a recess in the platform, and the controller is configured to retract and extend at least one of the cassette and the plurality of wheels between a retracted position and an extended position based on the data.

13. The cargo management system of claim 10, wherein the controller is configured to coordinate logistical information for moving a plurality of cargo devices and positioning the plurality of cargo devices based on the logistical information.

14. The cargo management system of claim 10, wherein the cargo device has at least a storage mode and a transport mode, and the controller is configured to at least one of retract and deploy the at least one of the plurality of wheels and the cassette between the storage mode and the transport mode based on the data.

15. The cargo management system of claim 14, wherein the controller is configured to prevent movement of the platform with respect to the surface in the storage mode via at least one of securing the cassette with the rail and locking of the plurality of wheels.

16. The cargo management system of claim 10, wherein the cargo device includes a battery which is configured to receive electrical power when the cassette is engaged with the rail.

17. The cargo management system of claim 16, wherein the battery powers one or more motors for at least one of propelling the plurality of wheels based on the data and a climate control system for controlling a cargo environment based on the data.

18. A method of managing cargo comprising:

providing a cargo device including a platform having wheels and one or more cassettes configured to engage with one or more rails in a surface, the cargo device being configured to receive instructions from a controller;

loading cargo onto the cargo device;

receiving data at the controller about the cargo at the cargo device to generate instructions;

actuating the wheels via the instructions to transport the cargo from a first location to a second location; and engaging the one or more cassettes with the one or more rails to electrically communicate or transfer power, logistical data, climate control instructions, or combinations thereof to the cargo device to move the cargo device from the first location to the second location.

19. The method of claim 18, wherein the wheels, the one or more cassettes, or both are retractable such that the controller extends or retracts the wheels and/or the one or more cassettes based on the data.

20. The method of claim 18, wherein the data is location, temperature, or destination information about the cargo.

* * * * *